J. W. WHITMARSH.
Nut-Lock.

No. 205,712.  Patented July 2, 1878.

WITNESSES  INVENTOR.

UNITED STATES PATENT OFFICE.

JOHN W. WHITMARSH, OF GALESBURG, ILLINOIS.

IMPROVEMENT IN NUT-LOCKS.

Specification forming part of Letters Patent No. 205,712, dated July 2, 1878; application filed May 11, 1878.

*To all whom it may concern:*

Be it known that I, JOHN W. WHITMARSH, of Galesburg, in the county of Knox and State of Illinois, have invented a new and valuable Improvement in Nut-Locks; and I do hereby declare that the following is a full, clear, and exact description of the construction and operation of the same, reference being had to the annexed drawings, making a part of this specification, and to the letters and figures of reference marked thereon.

Figure 1:
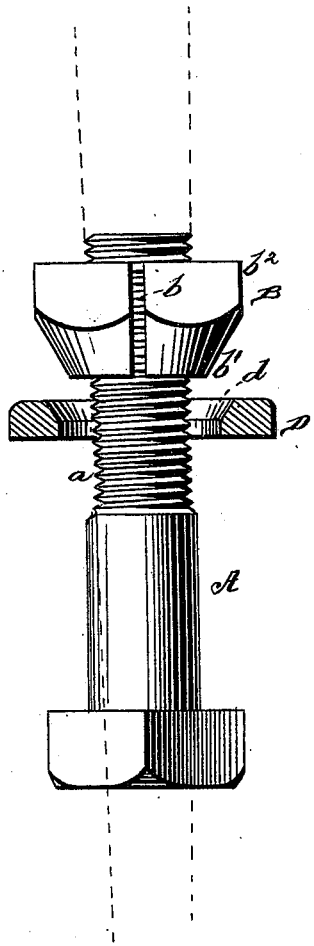
Figure 2:
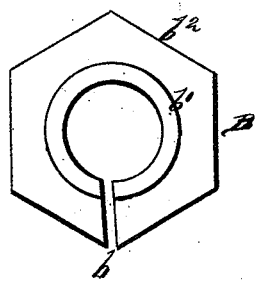

Figure 1 of the drawings is a part-sectional side view of my nut-lock as applied. Fig. 2 is a plan view of the nut.

My invention relates to devices for locking nuts on bolts; and it consists in the combination of an inversely-tapering screw-bolt, a conical split nut, and a countersunk seat for the nut, all as hereinafter more fully set forth.

The annexed drawings, to which reference is made, fully illustrate my invention.

A represents a screw-bolt, having its threaded portion made inversely tapering—that is to say, this threaded portion decreases gradually and slightly in diameter from the outer end inward toward the head, as shown by dotted lines in Fig. 1. B represents the nut, which is split lengthwise on one side only, forming an opening at $b$. The inner portion of this nut is made conical, as shown at $b^1$, while the outer portion $b^2$ is of the usual hexagonal or other form for the application of a wrench. In connection with this nut a washer, D, provided with a central countersink, $d$, forming a countersunk seat for the conical portion of the nut, is interposed, as required.

When the nut is screwed up its conical end enters the countersunk seat $d$, which compresses or clamps the nut on the bolt, and, in connection with the inverse taper of the threaded part $a$, effectually locks the nut on the bolt in such a manner that it cannot come loose by any jarring or concussions.

This nut-lock is applicable in any and every place where it is desired to securely lock the nut on a bolt. It is simple, comparatively cheap, and durable.

I am aware that a threaded bolt with the larger diameter farthest from the head, adapted to serve with a divided nut and cap, has been before known; but in such devices the position of the nut on the thread is governed by the size of the aperture in the cap.

I am also aware that split conical nuts have been used with recessed nuts in connection with bolts having threads of different and reverse pitch and different diameters, and such construction I do not broadly claim.

What I claim as new, and desire to secure by Letters Patent, is—

The combination, substantially as hereinbefore described, of the inversely-tapering screw-threaded bolt A, the washer D, having the countersunk seat $d$, and the conical nut B, split lengthwise on one side only, whereby the conical end of the nut enters the countersunk seat $d$ of the washer, which compresses the nut on the bolt, and the inverse taper of the threaded portion of the bolt effectually locks the nut on the bolt.

In testimony that I claim the above I have hereunto subscribed my name in the presence of two witnesses.

JOHN W. WHITMARSH.

Witnesses:
G. H. LANPHERE,
THOS. BROWN.